United States Patent
Sahhary et al.

(10) Patent No.: US 11,652,430 B2
(45) Date of Patent: May 16, 2023

(54) METHOD FOR DETERMINING AN OFFSET OF AN ANGULAR POSITION ENCODER ON A ROTOR SHAFT OF AN ELECTRIC MACHINE

(71) Applicant: VALEO SIEMENS EAUTOMOTIVE GERMANY GMBH, Erlangen (DE)

(72) Inventors: Bassel Sahhary, Erlangen (DE); Andreas Walter, Nuremberg (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 184 days.

(21) Appl. No.: 16/861,535

(22) Filed: Apr. 29, 2020

(65) Prior Publication Data

US 2020/0350840 A1 Nov. 5, 2020

(30) Foreign Application Priority Data

Apr. 30, 2019 (DE) ...................... 10 2019 111 146.3

(51) Int. Cl.
*H02P 6/17* (2016.01)
*G01D 5/244* (2006.01)
*G01D 5/245* (2006.01)
*G01D 5/249* (2006.01)

(52) U.S. Cl.
CPC .............. *H02P 6/17* (2016.02); *G01D 5/2448* (2013.01); *G01D 5/2457* (2013.01); *G01D 5/2497* (2013.01)

(58) Field of Classification Search
CPC .. G01D 5/2448; G01D 5/2457; G01D 5/2497; H02P 6/17
See application file for complete search history.

(56) References Cited

U.S. PATENT DOCUMENTS

| | | | | |
|---|---|---|---|---|
| 5,489,845 A * | 2/1996 | Weber | ................... | G05B 19/231 324/207.16 |
| 5,742,921 A * | 4/1998 | Oo | ......... | F02D 11/106 123/339.25 |
| 2012/0161725 A1* | 6/2012 | Hartman | ................... | H02P 9/02 322/99 |
| 2013/0193887 A1* | 8/2013 | Tanabe | ...................... | H02P 7/00 318/400.32 |
| 2015/0365027 A1* | 12/2015 | Fischer | ................ | G01D 5/2448 318/400.14 |
| 2016/0043676 A1* | 2/2016 | Adam | ....................... | H02P 6/16 318/400.02 |

FOREIGN PATENT DOCUMENTS

| | | |
|---|---|---|
| DE | 10 2011 087 396 A1 | 6/2012 |
| DE | 10 2012 222 494 A1 | 1/2014 |

\* cited by examiner

*Primary Examiner* — Rina I Duda
(74) *Attorney, Agent, or Firm* — Manabu Kanesaka

(57) ABSTRACT

A method for determining an offset of an angular position encoder is associated with a rotor of an electric machine, wherein a reference offset of a reference angular position encoder of a reference electric machine is known at a reference rotational speed and a reference current with a reference phase angle and a reference absolute value. The method includes the steps of applying a current having the reference absolute value; setting a phase angle of the current to achieve the reference rotational speed; comparing the phase angle with the reference phase angle and the reference offset; and determining the offset on the basis of this comparison.

4 Claims, 4 Drawing Sheets

METHOD FOR DETERMINING AN OFFSET OF AN ANGULAR POSITION ENCODER ON A ROTOR SHAFT OF AN ELECTRIC MACHINE

RELATED APPLICATIONS

The present application is based on, and claims priority from, German Application No. DE 10 2019 111 146.3 filed Apr. 30, 2019, the disclosure of which is hereby incorporated by reference herein in its entirety.

The invention relates to a method for determining an offset of an angular position encoder on a rotor shaft of an electric machine.

PRIOR ART

Electric motors as electric machines are known in general and are being used increasingly to drive vehicles. An electric motor consists of a stator and a rotor.

The stator comprises a plurality of slots, in which the windings are guided. The rotor is situated in the stator and is connected to a rotor shaft. To control the electric machine it is necessary to know the exact angular position of the rotor in the stator. The orientation angle may be measured continuously by means of what is known as an angular position encoder. The angular position encoder, for example, may be secured to the stator or a bearing plate, but must be arranged at a distance from the rotor.

Document DE 10 2011 087 396 A1 describes a method for mounting an angular position encoder on a rotor shaft of an electric motor. Since the physical position is never absolutely accurate, the deviation between the installed position and the desired position must be determined for each electric machine. This manufacturing-induced position deviation is also referred to as an offset. In the method know from DE '396, following the installation of the angular position encoder the exact position, that is to say the offset, relative to the rotor and the angular position encoder secured to the stator is determined on a motor test stand.

PROBLEM AND SOLUTION

The object of the present invention is to provide a method for determining the offset of the angular position encoder that is simple and time-saving.

In accordance with the invention, the method for determining an offset of an angular position encoder which is associated with a rotor of an electric machine, wherein a reference offset of a reference angular position encoder of a reference electric machine is known at a reference rotational speed and at a reference current with a reference phase angle and a reference absolute value, comprises the following steps: applying a current having the reference absolute value, setting a phase angle of the current to achieve the reference rotational speed, comparing the phase angle with the reference phase angle and the reference offset, and determining the offset on the basis of this comparison.

The reference current with reference phase angle and reference absolute value is determined in a reference electric machine at a reference rotational speed. In this reference machine the manufacturing-induced reference offset of the angular position encoder is determined in advance on a motor test stand by means of a known method. Using the known reference offset, the control system then sets a reference current having an optimal reference phase angle. The current components constituted by q current and d current enclose the phase angle in the complex plane, and the length of a current pointer represents the reference absolute value of the reference current.

In the case of an unknown offset, the phase angle would not be optimal and would lead to a shift from d current to q current.

For example in the case of operation of an electric machine as synchronous machine this would result in an increased energy consumption, or, in the extreme case, even a change to the direction of rotation, which is undesirable.

By contrast, by means of the reference machine with an angular position encoder with known reference offset, a reference phase angle is known at a reference rotational speed and a reference absolute value of the current.

In an electric machine with electric properties similar to those of the reference machine, that is to say for example the same winding pattern, the same number of stator grooves, and similar rotor, with the same manufacturing-induced deviation of the installed position of the angular position encoder, the same phase angle as in the reference machine would be established, in order to achieve the required reference rotational speed with optimal energy utilisation.

The manufacturing-induced deviation when installing the angular position encoder and the resultant offset of the angular position encoder are individual to the motor in question and therefore are different in comparison to the reference machine. Thus, the offset must be determined individually for each electric machine.

Since the optimal reference phase angle with reference absolute value are known at the reference rotational speed and the reference offset, and since the same, optimal phase angle with reference absolute value and the offset at the reference rotational speed would be established in a similar electric machine, the difference between the reference phase angle and phase angle is substantially equal to the offset of the angular position encoder created by the manufacturing-induced deviation. Here, "substantially" means for example that different electrical resistances in the turns of the various electric machines have a negligible influence on the phase angle.

In other words, the phase angle of the electric machine to be tested would be identical to the reference phase angle of the reference electric machine if both angular position encoders were to have the same offset. The deviation between the reference phase angle and the phase angle corresponds to the deviation of the offset of the electric machine to be measured from the reference offset of the reference machine. Since the reference offset is known, it is possible to determine the offset of the electric machine to be measured.

It is therefore possible to ascertain the offset for a large number of electric machines without an exact measurement of the offset of the angular position encoder of each individual electric machine on a motor test stand.

A series production of electric machines is therefore possible more economically and more quickly.

The offset may preferably be determined at two different reference rotational speeds, and a mean value may be formed on this basis.

This makes it possible to ascertain the offset more precisely, since errors in the individual measurements are taken into consideration to a lesser extent.

A further improvement when ascertaining the offset can be achieved by forming mean values or weighted average values from the values at the reference rotational speeds.

In a further preferred embodiment of the invention, the reference rotational speeds may have the same absolute value, but may be in different rotation directions.

In the case of exactly opposite rotational speeds, a phase angle in exactly opposite directions is to be assumed. Here, the offset is visible particularly clearly.

The reference rotational speed may further preferably lie in the range between a third and two thirds of a nominal motor rotational speed.

Within the operating range, the flowing current is of sufficient magnitude, and the losses through bearings and heating are still small enough to be able to measure an optimal phase angle.

In a further embodiment of the invention the method may be executable as an end-of-line test in the case of series production.

In this case, the starting point may be any electric machine of a series to be tested. The following electric machines must always be controlled to the predefined reference rotational speed. The particular offset of the angular position encoder is thus determined from the deviating phase angles.

In accordance with the invention an electric machine is equipped with an angular position encoder which has an offset determined in accordance with one of the preferred methods.

The electric machine may preferably be connected to an inverter.

The specific offset of the angular position encoder of the electric machine is substantially independent of the connected inverter, since the manufacturing-induced offset of the angular position encoder is always greater than an offset of the inverter caused by the signal transit time.

Even a change of the inverter between the determination of the reference phase angle of the reference machine and the offset of the angular position encoder of the electric machine has practically no influence on the phase angle and the ascertainment of the offset of the angular position encoder.

In accordance with the invention a vehicle has an electric machine, in particular an electric motor, with an angular position encoder, the offset of which has been determined in accordance with one of the preferred methods.

DESCRIPTION OF THE DRAWINGS

FIG. 1 schematically shows an electric machine 21, in particular an electric motor. The electric machine 21 is connected to an inverter 19 via three phases 27, which inverter supplies the electric machine 21 with alternating current from a direct current source—for example battery—(not shown).

Figure 1:
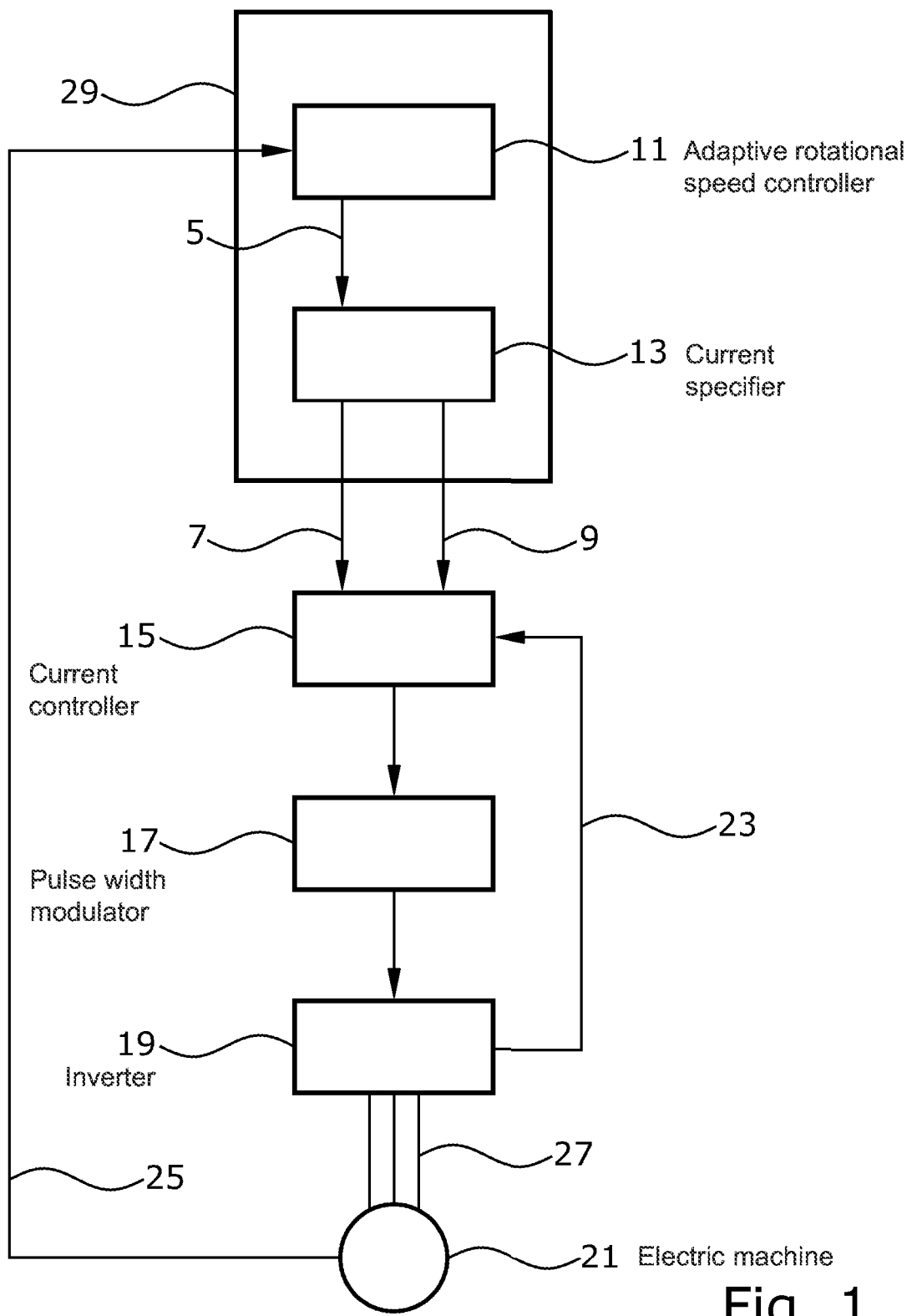
FIG. 1 shows an arrangement of an electric machine with an inverter and a controller.

A pulse width modulator 17 switches the switch elements in the inverter 19 in order to supply the electric machine with an alternating voltage from a direct voltage source. A current controller 15 defines to the pulse width modulator 17 what duty cycle of the inverter 19 should be set for inverting the current. The current controller 15 receives a response 23 from the inverter 19 regarding the current of the three phases 27 actually fed into the electric machine.

The current controller 15 receives, from a current specifier 13 in the rotational speed controller 29, the specifications for the current to be applied with current value and phase angle, that is to say values for q current 9 and d current 7. The adaptive rotational speed controller 11 for this purpose specifies to the current specifier 13 a phase angle 5 necessary for this purpose that the electric machine 21 should achieve. The adaptive rotational speed controller 11 in turn receives a response 25 from the electric machine 21 regarding the rotational speed actually present at the electric machine 21 and may correct the rotational speed as appropriate by means of an intervention on the part of the current specifier.

Since the rotational speed controller 29 with its components is necessary only for the determination of the offset, it is possible to dispense with this during operation of the electric machine once the offset has been determined, for example in a vehicle.

By means of the structure shown in FIG. 1, the offset with a known reference offset of the reference machine may be determined on structurally identical electric series machines.

Figure 2:
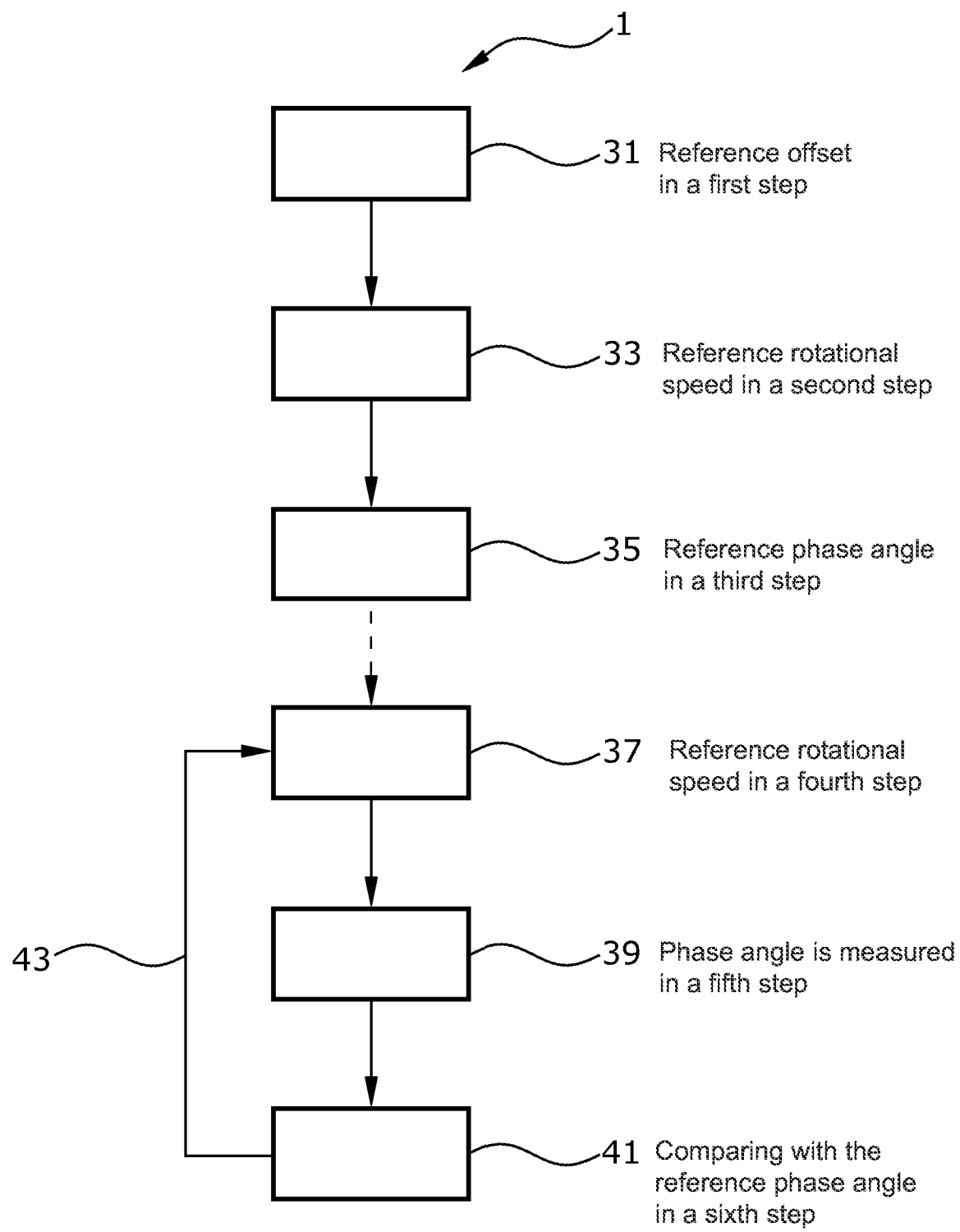
FIG. 2 shows a flow diagram of the invention.

FIG. 2 shows the course of the method 1 for determining the offset of the angular position encoder. In a first step 31 the reference offset of a reference machine is determined using a method known from the prior art.

In a second step 33, the reference machine is accelerated to a reference rotational speed in accordance with a structure shown in FIG. 1, and the reference phase angle is measured in a third step 35. The values thus obtained are then used subsequently when determining the offset of the electric machine or the machine to be measured. The reference absolute values are determined in an exemplary manner for the reference motor.

Hereinafter, the offset of a machine to be measured is determined in accordance with the structure of FIG. 1, wherein the machine to be measured is connected instead of the reference motor. For example, the motor inclusive of the inverter may also be changed in comparison to the reference machine. In a fourth step 37 the machine to be measured is accelerated to the reference rotational speed, and the phase angle is measured in a fifth step 39.

In a sixth step 41 the set phase angle is compared with the reference phase angle. The deviation corresponds to the difference between the offset of the electric machine to be measured and the reference offset of the reference machine. Since this reference offset is known, it is now possible to determine the offset of the electric machine to be measured.

As seventh step 43, a checking of the determined offset is optionally possible. The determined offset is set as the offset of the machine to be measured. The phase angle present after acceleration to the reference rotational speed is now substantially identical to the reference phase angle, regardless of the different offsets of the two machines.

For the use as series test it is necessary to perform steps four to six and optionally seven in any produced motor in order to determine the offset of the angular position encoder. Alternatively, steps four to six and optionally seven may be performed with any produced motor and inverter combination.

Figure 3:
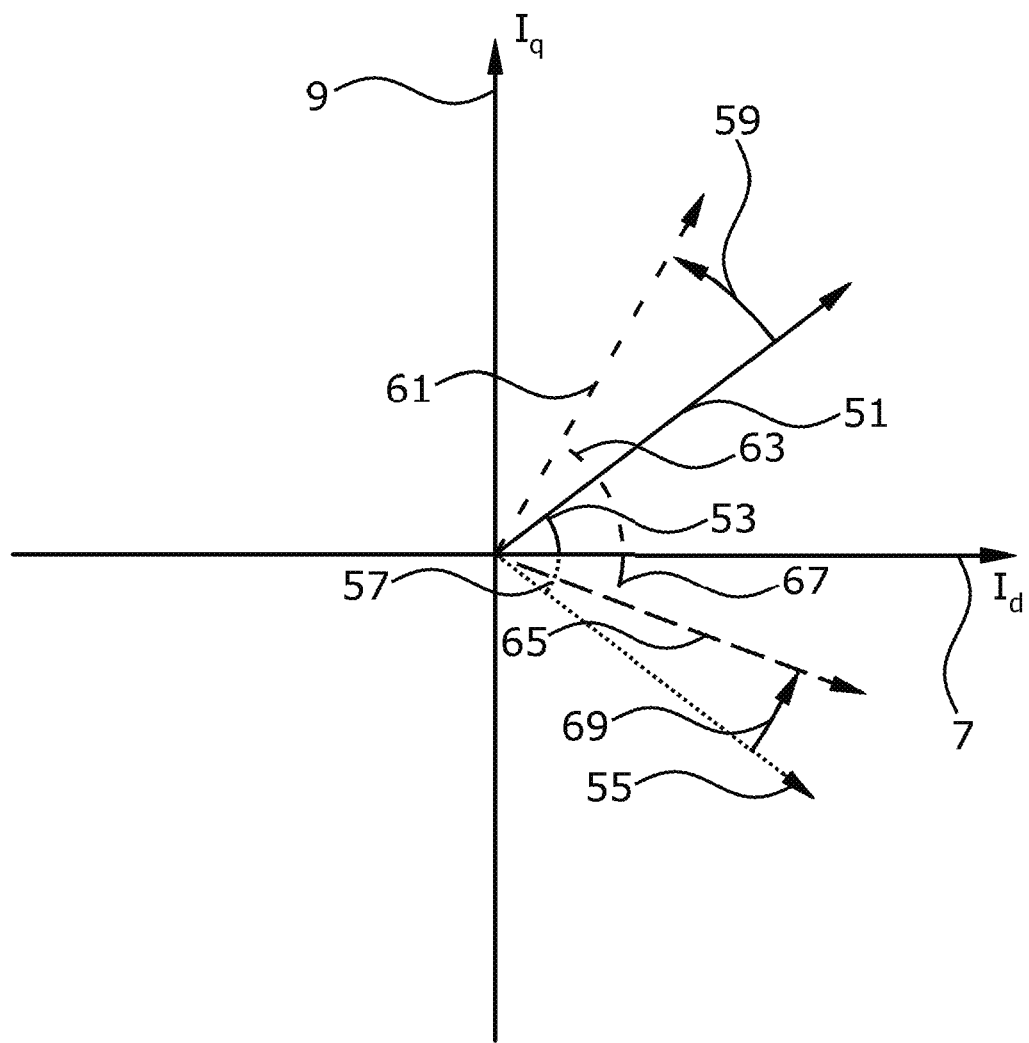
FIG. 3 shows a pointer diagram with an applied current in the complex plane.

FIG. 3 shows an example of a current pointer graph in the complex plane. The d current Id 7 is plotted on the abscissa, and the q current Iq 9 is plotted on the ordinate.

The solid arrow 51 represents the vector of a reference current of the reference electric machine.

In the case of the reference electric machine, the reference current 51 is applied at a predefined reference rotational speed. The reference phase angle 53 present in this case is the argument of the vector 51. Since, in the case of this reference machine, the angle of the angular position encoder is correct due to the known reference offset, the reference current ensures optimal operation of the reference machine.

A further reference current vector 55 (shown by the dotted line) may optionally be applied at a second reference rotational speed, for example a negative rotational speed. The resultant second argument 57 of this second reference current vector 55 may additionally be used as a second reference phase angle 57 for more accurate determination of the offset.

In an electric machine to be measured, with unknown offset of the angular position encoder, a current 61 is applied at the predefined reference rotational speed. The phase angle 63 present in this case is the argument of the current presented as a short-dash vector 61. Since, in this machine to be measured, the angle of the angular position encoder is inaccurate due to the unknown offset, the current does not ensure optimal operation of the machine to be measured.

Optionally, a further current vector 65 (showed by long dashes) may be applied at the second reference rotational speed, for example a negative rotational speed. The resultant second argument 67 of this second current vector 65 may additionally be used as second phase angle 67 for more accurate determination of the offset.

The difference between the reference phase angle 53 of the reference machine and the phase angle 63 of the machine to be measured at the same reference rotational speed gives the deviation of the offset of the machine to be measured from the reference offset. Since the reference offset of the reference machine is known, the offset may be determined for example as the sum of reference offset and the difference 59 of the phase angle 63 and reference phase angle 53 at the reference rotational speed.

The same calculation may be performed optionally for the second reference rotational speed. A second offset 69 is thus determined from the sum of the reference offset and the difference 69 of the second phase angle 67 and second reference phase angle 57 at the second reference rotational speed. The offset may optionally be corrected by the second offset.

The uniform length of all vectors shows that the absolute values of all currents are identical.

Figure 4:
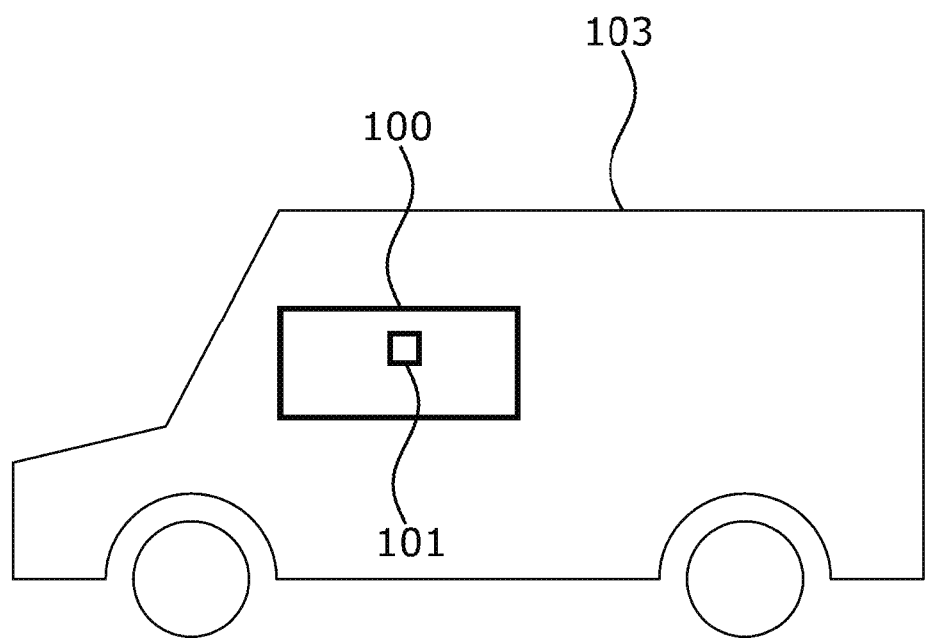
FIG. 4 shows a vehicle with an electric machine and an angular position encoder.

FIG. 4 is a schematic sketch of an exemplary embodiment of a vehicle 103, for example a hybrid vehicle or an electric vehicle, comprising an electric machine 100, in particular an electric motor for driving the vehicle, with an angular position encoder 101, the offset of which is determined by means of the method according to the invention.

The invention claimed is:

1. A method for determining an offset of an angular position encoder, which is associated with a rotor of an electric machine, wherein a reference offset of a reference angular position encoder of a reference electric machine is known at a reference rotational speed and at a reference current with a reference phase angle and a reference absolute value, said method comprising the following steps:
   applying a current having the reference absolute value;
   setting a phase angle of the current to achieve the reference rotational speed;
   comparing the phase angle with the reference phase angle and the reference offset; and
   determining the offset on a basis of this comparison,
   wherein the offset is determined at two different reference rotational speeds and a mean value is formed.

2. The method according to claim 1, wherein the reference rotational speeds have the same absolute value, but are in different rotation directions.

3. The method according to claim 1, wherein applying the current as an end-of-line test in a case of series production.

4. A method for determining an offset of an angular position encoder, which is associated with a rotor of an electric machine, wherein a reference offset of a reference angular position encoder of a reference electric machine is known at a reference rotational speed and at a reference current with a reference phase angle and a reference absolute value, said method comprising the following steps:
   applying a current having the reference absolute value;
   setting a phase angle of the current to achieve the reference rotational speed;
   comparing the phase angle with the reference phase angle and the reference offset; and
   determining the offset on a basis of this comparison,
   wherein the reference rotational speed lies in a range between one third and two thirds of a nominal motor rotational speed.

* * * * *